Oct. 26, 1965

A. L. WELLFORD 3,214,599

VOLTAGE REGULATOR FOR D.C. GENERATOR

Filed June 13, 1961

INVENTOR.
ARMISTEAD L. WELLFORD

BY Isidore Match

ATTORNEY

FIG. 2

INVENTOR.
ARMISTEAD L. WELLFORD
BY Isidore Match
ATTORNEY

INVENTOR.
ARMISTEAD L. WELLFORD
BY
Isidore Match
ATTORNEY

United States Patent Office 3,214,599
Patented Oct. 26, 1965

3,214,599
VOLTAGE REGULATOR FOR D.C. GENERATOR
Armistead L. Wellford, Waynesboro, Va., assignor to General Electric Company, a corporation of New York
Filed June 13, 1961, Ser. No. 116,803
15 Claims. (Cl. 307—84)

This invention relates to voltage regulators. More particularly, it relates to a regulator which maintains substantially constant the output voltage of a generator over its speed and load range.

In order to self-excite and regulate the voltage of a compound wound D.C. generator, means are required which can vary the current supplied to the shunt field thereof whereby a regulated voltage is produced over a wide range of speed and load.

Heretofore, to regulate the voltage of such D.C. generator at a relatively low ambient temperature such as about 70° C., there have been utilized carbon pile regulators or switching type germanium transistor regulators. However, such voltage regulators are not satisfactory at relatively high ambient temperatures such as 120° C. There are 120° C. carbon pile regulators in existence but such regulators are devices which present the attendant disadvantages of the mechanical problems of maintenance and short pile life with consequent frequent replacement thereof being necessary.

It is, accordingly, an important object of this invention to provide means for providing substantially constant output voltage from a D.C. generator at a relatively high ambient temperature.

It is another object to provide a regulator in accordance with the preceding object which is simple and is of the static type.

Generally speaking, and in accordance with the invention, there are provided in combination with a direct current generator having a shunt field, a reference voltage and means in circuit with the reference voltage and the output of the generator for comparing the voltages therefrom to produce a difference voltage therebetween. There is further included means which are periodically rendered conductive in response to the difference voltage for chosen durations, the times between such durations varying with the magnitude of the difference voltage. The shunt field is supplied with substantially constant current from said last-named means, the value of this constant current being varied to achieve regulation.

An important feature of the invention resides in means including a variable frequency pulse oscilaltor for providing pulses having intervals therebetween whose widths vary as a function of the magnitude and direction of a difference voltage produced by comparing the output voltage of the generator with a reference voltage of a desired value, and a power circuit which is gated into conductivity by the pulses from the pulse oscillator, the power circuit supplying current to the shunt field of the generator during its conductive periods.

Another important feature of the invention resides in an arrangement for controlling the aforesaid pulse oscillator whereby it is prevented from being enabled unless the output voltage of the generator is at a chosen level and wherein an output pulse therefrom cannot be produced until the conduction cycle of the power circuit effected by an immediately preceding output pulse has been completed.

A further feature of the invention resides in an arrangement for preventing the gating of the power circuit into conductivity during initiation of operation unless the output voltage of the D.C. generator has been built up to such minimum level whereby immediate commutation failure in the power circuit is prevented.

The novel features, which are believed to be characteristic of this invention, are set forth with particularity in the appended claims. The invention itself, however, both as to organization and method of operation together with further objects and advantages thereof may best be understood by reference to the following description taken in connection with the accompanying drawings.

In the drawings:
FIGS. 2 and 3 taken together as in FIG. 4 is a schematic depiction of the regulator shown in block form in FIG. 1.

In the system of this invention, the output voltage of the generator is compared with a reference voltage developed across a reference element such as a Zener diode. The difference voltage between the reference and output voltages is applied to a control winding of a magnetic amplifier, there being applied to the gate windings of such magnetic amplifier, the oppositely phased outputs of a square wave multivibrator. The output of the magnetic amplifier is utilized to actuate a variable frequency oscillator such as a relaxation oscillator containing a unijunction transistor as the active element therein. The output of the relaxation oscillator is applied as input to a pulse amplifier, the output pulses from the amplifier being utilized to trigger a power switching device such as a gate controlled rectifier in a power circuit. The current flowing through the gate controlled rectifier is supplied to the shunt field of the D.C. generator. The difference voltage applied to the control winding of the magnetic amplifier is in such polarity as to increase the output of the magnetic amplifier when the reference voltage exceeds the output voltage and to decrease the output of the magnetic amplifier when the output voltage exceeds the reference voltage.

There having thus generally been indicated the character of the invention to be described, a more detailed description of its structure and operation is proceeded with.

Figure 1:
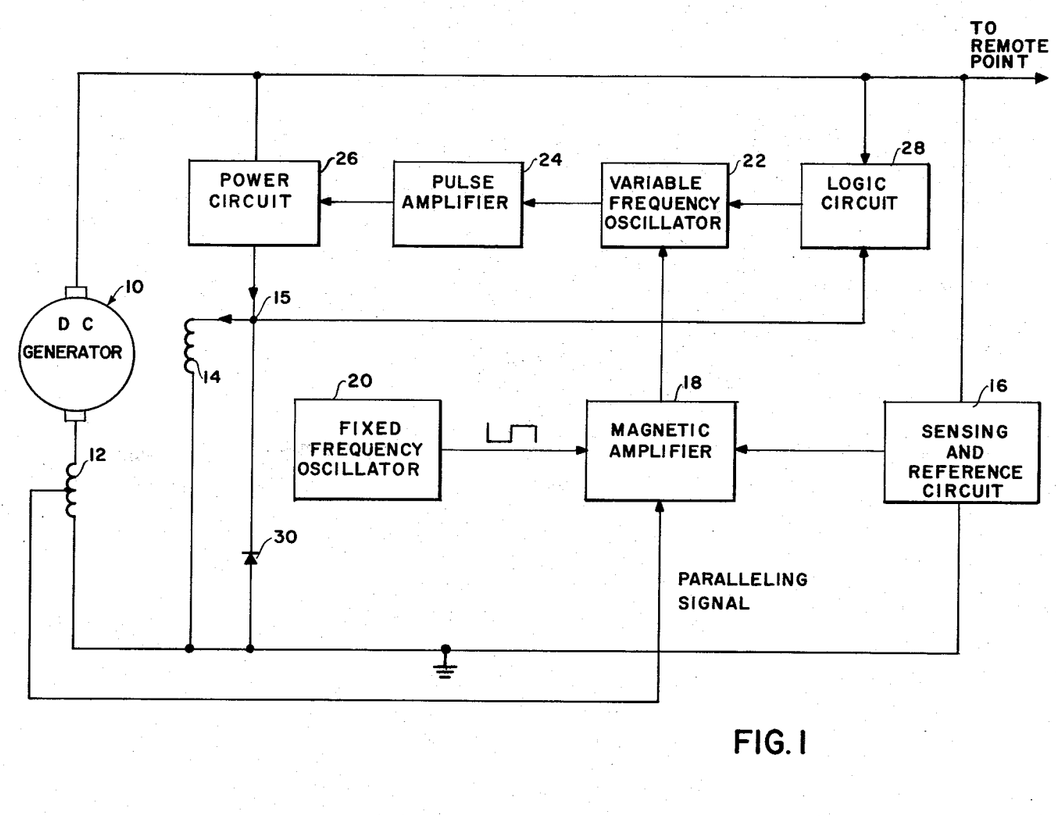
FIG. 1 is a block diagram of a regulator according to the invention.

Referring now to FIG. 1, the D.C. generator 10 whose output voltage it is desired to regulate over its speed and load range comprises a series field 12 and a shunt field 14. The output voltage which is regulated from a remote point is applied to a sensing and reference circuit stage 16. Sensing and reference circuit 16 may suitably comprise a source of reference voltage which may be a voltage derived from the output voltage of generator 10 and also includes means for comparing the output voltage with such reference voltage to derive a difference voltage therebetween. This difference voltage is developed across a control winding of a magnetic amplifier 18. The latter control winding of the magnetic amplifier is so poled whereby when the output voltage exceeds the reference voltage, the direction of current flow through the control winding is such as to decrease the positive ampere turns therein and thereby decrease the magnetic amplifier output, and when the reference voltage exceeds the output voltage, the direction of current flow through the control winding is such as to increase the positive ampere turns therein and thereby increase the output of the magnetic amplifier.

Also applied to magnetic amplifier 18 is the output of a fixed frequency oscillator 20, such output supplying the A.C. voltages for the gate windings of the magnetic amplifier. Fixed frequency oscillator 20 may suitably be a square wave multivibrator such as the magnetic coupled type.

The output of magnetic amplifier 18 is applied to a variable frequency oscillator 22, which provides output pulses in response to the application of a voltage which is at least equal to a chosen value, the output frequency of such oscillator being determined by the values of components comprising a time constant circuit therein and by the magnitude of the output voltage applied thereto from magnetic amplifier 18. Variable frequency oscillator 22 may suitably be a relaxation oscillator employing a unijunction transistor as the switching element therein.

The output pulses from variable frequency oscillator 22 are amplified in a pulse amplifier 24 and the output of pulse amplifier 24 is applied to a power circuit 26.

In power circuit 26, the pulses from pulse amplifier 24 gate into conductivity, a switching element such as a gate controlled rectifier, the current flowing through the gate controlled rectifier being supplied to shunt field 14. Power circuit 26 also suitably comprise means for effecting the switching back of the gate controlled rectifier to the nonconductive state after a gating pulse has been applied thereto whereby the gate controlled rectifier is conditioned to receive the next gating pulse from pulse amplifier 24. The means for switching the silicon controlled rectifier from the conductive to the nonconductive state may suitably comprise a saturable current transformer operating in conjunction with a capacitor, the saturation of such transformer causing the switching of the charged capacitor across the gate controlled rectifier in a direction such as to render the gate controlled rectifier nonconductive.

To review the operation of the arrangement of FIG. 1, the sensing of an output voltage which exceeds the desired or reference voltage, decreases the output of magnetic amplifier 18, thereby decreasing the output frequency of variable oscillator 22. This in turn results in a lesser average conduction time for the gate controlled rectifier in the power circuit, i.e., less gating pulses are applied thereto in a given interval, whereby less current is supplied therefrom to shunt field 14. When the reference voltage exceeds the output voltage, the opposite events ensue.

Logic circuit stage 28 controls variable frequency oscillator 22 in that it prevents its enabling if the voltage from generator 10 is not at least at a chosen level initially and also prevents its enabling if the generator voltage falls below a desired level during operation. Logic circuit stage 28 also prevents its enabling if the conduction cycle in power circuit 26 effected by the immediately preceding pulse from pulse amplifier 24 is not completed.

Diode 30 operates in conjunction with logic circuit stage 28 in that when the voltage in shunt field 14 is negative whereby junction 15 is at ground potential, the supply voltage to variable frequency oscillator 22 is such that it can function normally. When the voltage in shunt field 14 is positive, diode 30 functions as a blocking device and the consequent application of supply voltage to variable frequency oscillator stage 22 is controlled by logic circuit stage 28 whereby it is prevented from being disabled.

The paralleling signal from series field 12 to magnetic amplifier 18 permits the effecting of load division by another control windnig in magnetic amplifier 18 when a system comprising the generator and regulator of FIG. 1 is paralleled with one or a plurality of similar systems.

Figure 2:
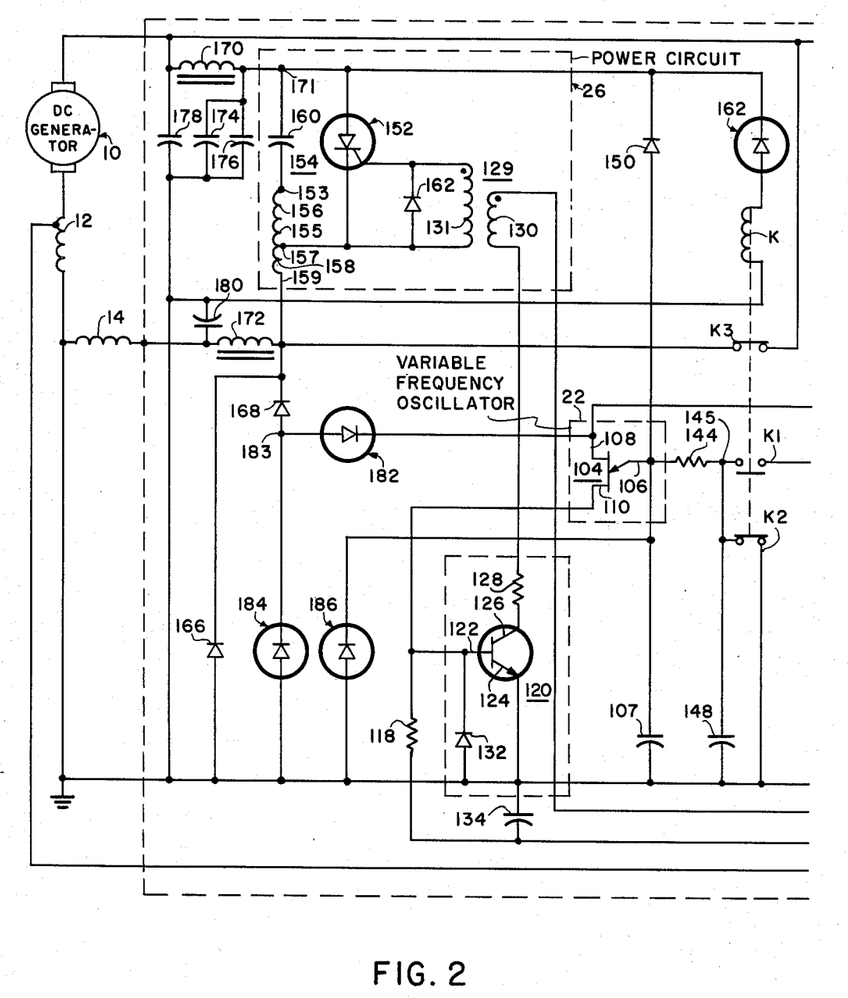
Figures 3, 4:
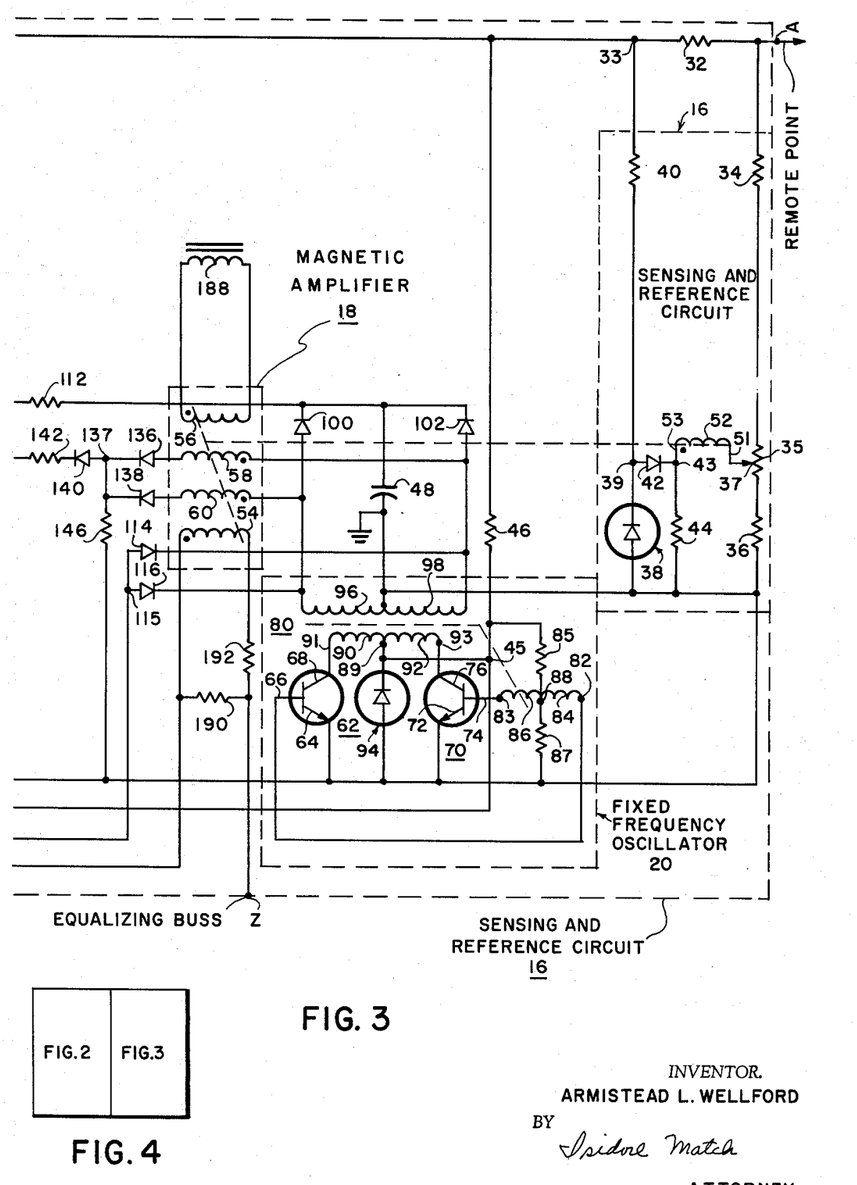

Referring now to FIGS. 2–4, terminal A is directly connected to a remote point where regulation is accomplished such as at a load of D.C. generator 10. With this arrangement remote sensing is provided which is independent of any drop in the feeder from the generator, i.e., line drop. A resistor 32 is included between generator 10 and terminal A to supply a secondary sensing path in the event that the lead from terminal A is accidently opened.

In the sensing and reference circuit, there are provided a resistor 34 having a terminal connected to terminal A, a resistor 36 connected to ground and a variable resistor 35 connected between resistor 34 and resistor 36. Connected between ground and the junction 33 of resistor 32 and generator 10 is a series arrangement comprising the anode to cathode path of a reference diode 38 and a resistor 40. A series arrangement of the anode to cathode path of a diode 42 and a control winding 52 of magnetic amplifier 18 is connected between the junction 39 of resistor 40 and reference diode 38 and a point 37 on resistor 35. The junction 43 of diode 42 and control winding 52 is connected to ground through a resistor 44.

In the operation of the sensing and reference circuit, a reference voltage is provided across reference diode 38. Resistors 34, 35 and 36 comprise a voltage divider which supplies the proper voltage level for comparison with the voltage across reference diode 38. Control winding 52 of magnetic amplifier 18 is disposed between the reference diode 38 and the voltage divider, the difference between the two voltages being developed as an error signal across this winding. Diode 42 and resistor 44 provide a current limiting circuit which prevents the magnetic amplifier from being driven during overvoltage transient conditions into so-called "backside operation," i.e., from behaving as if a voltage of the opposite polarity were being applied thereto when the voltage actually applied thereto is in the direction of de-energization.

A square wave voltage is provided as an input to magnetic amplifier 18 from the fixed frequency oscillator 20, the fixed frequency oscillator shown in FIGS. 2–4 being a center tap connected magnetically coupled multivibrator. The multivibrator comprises a first transistor 62 having an emitter 64 connected to ground, a base 66 connected to the polarity dot terminal 82 of the secondary winding 84 of a saturable transformer 80 and a collector 68 connected to the non-polarity dot terminal 91 of a primary winding 90 of saturable transformer 80.

The multivibrator also comprises a second transistor 70 having an emitter 72 connected to ground, a base 74 connected to the non-polarity dot terminal 83 of a secondary winding 86 of transformer 80 and a collector 76 connected to the polarity dot terminal 93 of a primary winding 92 of transformer 80. The junction 89 of primary windings 90 and 92 is connected to ground through the cathode to anode path of a reference diode 94 and is also connected to junction 33 through a resistor 46. The junction 88 of secondary windings 84 and 86 is connected to ground through a resistor 87 and is also connected to junction 33 through the series arrangement of a resistor 85 and resistor 46.

In the multivibrator, reference diode 94 serves to regulate the input D.C. voltage applied thereto from junction 45. Transformer 80 may suitably comprise a saturable auto-transformer. Resistors 85 and 87 provide a voltage divider which establishes the operating points for base 66 and base 74 respectively.

In the operation of the multivibrator, upon the application thereto of the D.C. voltage from junction 45, the voltage divider comprising resistors 85 and 87 biases to emitter junctions of both transistors in such a direction as to render them both conductive. However, any small unbalance causes one transistor to become conductive before the other. If it is assumed that transistor 62 is rendered conductive first, the polarity of winding 84 is such that when transistor 62 conducts, positive voltage is applied at base 66 with respect to junction 88 thereby increasing the conductivity in transistor 62 and holding it conductive until the core of transformer 80 saturates a constant number of volt-seconds later.

While transistor 62 is biased in the conductive direction, it is to be noted that the reverse polarity occurring in winding 86 is biasing transistor 70 further in the nonconductive direction. When the core of transformer 80 saturates after transistor 62 has been conductive for a given period, the base drive on transistor 62 collapses and transistor 70 is substantially immediately rendered conductive. In this manner, transistor 70 supplies the other half cycle of output from the multivibrator.

The volt-second characteristics of the core of transformer 80 and the input voltage to the multivibrator as determined by diode 94 are suitably chosen to give a constant frequency output of a desired value such as about 4 kc., the output being a substantially constant amplitude rectangular wave voltage.

The voltages appearing on secondary windings 96 and 98 of transformer 80 are rectified by diodes 100 and 102, the rectified output therefrom being applied to the base electrode 108 of a unijunction transistor 104 through a resistor 112. The voltages on secondary windings 96 and 98 are also rectified by diodes 114 and 116, the voltage appearing at the junction 115 of the anodes of diodes 114 and 116 being applied through a resistor 118 to the base 122 of the transistor 120 in the pulse amplifier circuit. A filter capacitor 134 is provided between ground and junction 115 and a filter capacitor 48 is provided between ground and the junctions of the cathodes of diodes 100 and 102.

The voltage from secondary winding 96 is also applied to the gate winding 60 of magnetic amplifier 18 and the voltage from winding 98 is applied to gate winding 58. Thereby, there is supplied to the magnetic amplifier the rectangular wave output voltage from the multivibrator. The outputs of gate windings 58 and 60 are rectified in diodes 136 and 138, the signal appearing at junction 137 of the cathodes of diodes 136 and 138 being passed through the anode to cathode path of a diode 140 and applied to the emitter 106 of unijunction transistor 104 through the series arrangement of a resistor 142, the normally open contacts K1 associated with relay K when closed and a resistor 144. Since the load for the magnetic amplifier is the capacitor 107 connected between emitter 106 of unijunction transistor 104 and ground, an exciting current path for gate windings 58 and 60 is supplied from junction 137 to ground through a resistor 146. The junction 145 of resistor 144 and contacts K2 is grounded through a capacitor 148. Resistor 142 and capaictor 148 comprise a filter which supplies additional smoothing. Junction 145 is also connected to ground through normally closed contacts K2 associated with relay K as will be further explained hereinbelow. Diode 140 functions to decouple from the capacitive load comprising capacitor 107 whenever it is necessary to maintain the exciting current path.

The variable frequency relaxation oscillator comprises unijunction transistor 104 in which the emitter 106 is connected to ground through capacitor 107 and is also connected to the anode of the silicon controlled rectifier 152 in the power circuit 26 through the anode to cathode path of a diode 150. Base 110 of transistor 104 is directly connected to base 122 of transistor 120, and base 108 of transistor 104 is connected to the cathodes of diodes 100 and 102 through resistor 112 as previously described.

The characteristics of a unijunction transistor as transistor 104 are such that with a constant voltage impressed between base 108 and base 110, very little emitter current flows until the potential at the emiter is raised above the potential at base 110 to approximately 0.7 of the voltage between base 108 and base 110. If such point is exceeded, the transistor "fires," i.e., it is rendered heavily conductive whereby capacitor 107 rapidly discharges into base 122 of transistor 120.

Transistor 120 and its associated circuit components comprise a pulse amplifier. The collector 126 of transistor 120 is connected to junction 45 through the series arrangement of a resistor 128, and the primary winding 130 of a transformer 129. Base 122 is connected to ground through the cathode to anode path of a diode 132 and emitter 120 is grounded. The frequency of the pulse input to base 122 of transistor 120 is determined by the frequency of the output of the varible frequency relaxation oscillator 22, such frequency essentially being established by the charging time constant of resistor 144 and capacitor 107 and by the voltage applied to emitter 106 of transistor 104 from magnetic amplifier 18.

To understand the function of the relaxation oscillator in the regulator of this invention, let it be assumed that the output voltage appearing at terminal A is greater than a desired value, i.e., the reference value. Accordingly, current flows in control winding 52 of magnetic amplifier 18 from terminal 51 to terminal 53 thereof, such direction of current flow tending to decrease the output of the magnetic amplifier. Accordingly, in such situation, since the output voltage of the magnetic amplifier would be reduced, consequently the frequency of the output of relaxation oscillator 22 would also be decreased. Since the output pulses appearing across the secondary winding 131 of transformer 129 are applied to the gate electrode of a silicon controlled rectifier 152 in power circuit 26, the average conduction period of silicon controlled rectifier 152, i.e., its average "on" time would be reduced whereby the average shunt field current would also be reduced. This, in turn, causes a reduction in the output voltage of the system until the desired level is again attained. The adjustment of the desired level can be made by varying the value of variable resistor 35 in the sensing and reference circuit. In the pulse amplifier, diode 132 is included between base 122 and ground to insure that the potential at base 122 is negatively clamped to ground except when transistor 104 is conductive.

The power circuit 26 comprises the silicon controlled rectifier 152 previously mentioned and having an anode connected to generator 10 through an inductor 170 and to the cathode of diode 150. The cathode of silicon controlled rectifier 152 is connected to shunt field 14 through a portion 158 of a saturable current transformer 154 and an inductor 172. Saturable current transformer 154 is connected to the junction 171 of inductor 170, and silicon controlled rectifier 152 through a capacitor 160. The secondary winding 131 of pulse transformer 129 is connected between the gate and cathode electrodes of silicon controlled rectifier 152, the cathode to anode path of a diode 162 being connected in shunt with secondary winding 129.

The power circuit functions to vary the current in shunt field 14 as a function of the generator output voltage by momentarily connecting the shunt field across the armature circuit of the generator in a constant "on-time," variable "off-time" manner. The momentary connection is mated through inductor 170, silicon controlled rectifier 152, portion 158 of saturable current transformer 154 and inductor 172. Inductor 170 and capacitors 174, 176 and 178 comprise an input ripple and radio-noise filter while inductor 172 and capacitor 180 comprise an output filter. Inductor 170 and capacitors 174, 176 and 178 also supply the required field current transiently and prevent the generator voltage from being "chopped up." The power circuit essentially consists of silicon controlled rectifier 152, saturable current transformer 154 and turn off capacitor 160.

In the operation of the power circuit, when a trigger pulse is applied to the gate electrode of silicon controlled rectifier 152 from secondary winding 131 thereby rendering it conductive, current flows through the primary winding 158 of transformer 154, and inductor 172 and shunt field 14. Due to transformer action in the yet unstaturated saturable current transformer 154, current also flows through portion 156 of transformer 154, i.e., its secondary winding to charge capacitor 160, the lower plate of capacitor 160 becoming the positively charged side. As capacitor 160 charges up more voltage appears across saturable current transformer 154 until it receives the requisite amount of volt-seconds whereby it saturates sharply thereby switching charge capacitor 160 across silicon controlled rectifier 152. Consequently, the anode to cathode voltage of silicon controlled rectifier 152 is reversed to render it non-conductive. Current continues to flow through capacitor 160 and transformer 154 until capacitor 160 is charged to the voltage from generator 10, i.e., the line voltage.

Capacitor 160 tends to overcharge due to the after-saturation inductance of saturable current transformer 154. At this point, the current in capacitor 160 reverses substantially immediately bringing saturable current transformer 154 out of saturation and the overvoltage on capacitor 160 slowly resets the core of transformer 154.

If a gating pulse is applied to silicon controlled rectifier 152 before reset has been completed, some additional reset is applied by transformer action of transformer 154. The latter causes the voltage across primary winding 158, to add to that of generator 10 just after silicon controlled rectifier 152 is rendered conductive. Such primary winding voltage reverses as capator 160 charges, and saturable current transformer 154 swings toward saturation in another turn-off operation.

Figure 5A:
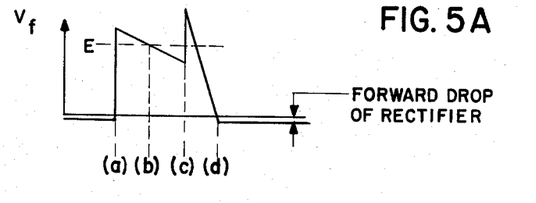
FIGS. 5A, 5B and 5C are graphs conveniently utilized in explaining the operation of the power circuit employed in the regulator of FIG. 1 and FIGS. 2–4.
Figure 5B:
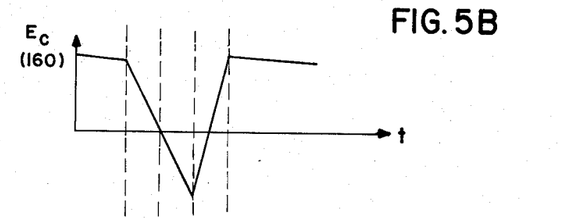
Figure 5C:
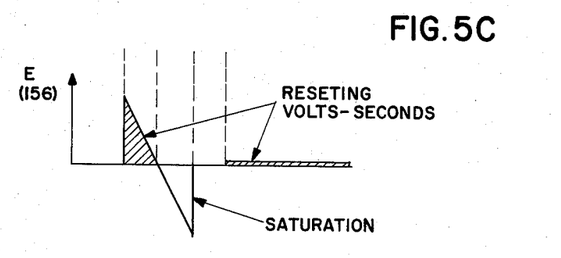

To understand the operation of the power circuit, reference is also made to FIGS. 5A, 5B and 5C. It has been shown that during the operation of the power circuit, capacitor 160 is charged to the source voltage E from generator 10 as seen in FIG. 5B($a$). When silicon controlled rectifier 152 is gated into conductivity, charged capacitor 160 is switched across unsaturated saturable current transformer 154 whereby terminal 157 of transformer 154 is positive with respect to terminal 153 and accordingly, terminal 159 is positive with respect to terminal 157. The voltage in primary winding 158 of transformer 154 is then added to the source voltage to provide the field voltage $Vf$ as is seen in FIG. 5A.

Capacitor 160 supplies energy to the field until time ($b$) when its voltage goes through zero. At this point, there is no voltage across the saturable current transformer windings and the field voltage $Vf$ is equal to the source voltage E (FIG. 5A). The current through silicon controlled rectifier 152 has been dividing in saturable current transformer 154, according to the latter's turns ratio, the greater portion of the current flowing into shunt field 14.

After time ($b$), FIG. 5A, current continues flowing into the capacitor 160 charging it in the reverse direction. After time ($b$), the voltage across the winding 156 of transformer 154 as seen in FIG. 5C is reversed. After sufficient volt seconds, i.e., at time ($c$) in FIG. 5c, saturable current transformer 154 saturates sharply switching charged capacitor 160 across silicon controlled rectifier 152 with the polarity to render silicon controlled rectifier 152 nonconductive.

After the latter commutation, current continues to flow through capacitor 160, recharging it to voltage E. As shunt field 14 is highly inductive, the charging of capacitor 160 occurs in a constant current or linear manner. Capacitor 160 tends to overcharge slightly due to the after saturation inductance of saturable current transformer 154. When the charging current for capacitor 160 tends to reverse, saturable current transformer 154 comes out of saturation and the small overvoltage on capacitor 160 slowly resets the saturable current transformer core.

It is to be noted in FIG. 5C that any area above zero constitutes resetting volt seconds. If silicon controlled rectifier 152 is again triggered into conductivity before the aforesaid slow reset has been completed, additional resetting is supplied by capacitor 160. Resetting voltseconds occur in the next cycle during the interval between ($a$) and ($b$).

It is important to realize that sufficient reset must be obtained for each cycle. If capacitor 160 is not permitted to recharge prior to the gating of silicon controlled rectifier 152 into conductivity, saturable current transformer 154 may saturate before enough ampere-seconds have been stored in capacitor 160. These ampere-seconds are required to detour the load current around silicon controlled rectifier 152 for a given period, such as about 20 microseconds, during its non-conducting time.

If such recharging of capacitor 160 prior to the gating into conductivity of silicon controlled rectifier 152 is not ensured, a commutation failure in the first cycle of operation might result. Also, when maximum output, i.e., when triggering pulses for silicon controlled rectifier 152, which follow closely on each other are required, if a gating pulse is applied to silicon controlled rectifier 152 before it has completed its prior conduction cycle, and capacitor 160 has not recharged to the source voltage a commutation failure might result at that point. Also, a source voltage of at least a given value is needed for reliable commutation at any frequency for gating silicon controlled rectifier 152 into conductivity. Insuring against such commutation failures is explained hereinbelow in connection with the description and explanation of operation of the logic circuitry.

The power circuit supplies a constant current pulse to shunt field 14 each time that silicon controlled rectifier 152 is gated into conductivity. The charge time of capacitor 160 from time ($c$) to time ($d$) as shown in FIG. 5B varies inversely with the level of the current through shunt field 14 but causes a relatively small variation in pulse width, such as about less than a two to one variation.

It has been stated hereinabove that it is desirable to have a source voltage of at least a given value. Accordingly, the voltage levels in relaxation oscillator 22 are so arranged whereby emitter 106 has to be charged to a voltage slightly above such given value in order for unijunction transistor 104 to be rendered conductive. Emitter 106 is connected to the input supply voltage through diode 150. If such input voltage falls below the aforesaid given value, capacitor 107 discharges through diode 150 preventing the rendering conductive of transistor 104 and the gating into conductivity of silicon controlled rectifier 152 until the input voltage rises above the given value.

If turn-off capacitor 160 is not permitted to charge to a voltage of the aforesaid given value prior to the first cycle of operation, it has been stated above that a commutation failure might occur. Relay K insures that no gating into conductivity of silicon controlled rectifier 152 can occur until capacitor 160 has charged to a voltage substantially greater than the aforesaid given value. Such insuring is accomplished with relay K and its associated normally closed contacts K2 connected across capacitor 148 and its associated normally open contacts K1 in the magnetic amplifier charging circuit.

The actual regenerative build-up of the voltage from generator 10 from its residual (permanent magnetism) value to the desired voltage regulated level is accomplished by the connecting of shunt field 14 across the armature of generator 10 thereby providing a minimum resistance path. During the buildup of voltage from generator 10, when the given level has been attained, current flows through reference diode 162 and through the operating coil of relay K to energize it. With the energization of relay K, normally closed contacts K2 and normally open contacts K1 associated therewith are switched to the opposite states thereby respectively transferring the current from shunt field 14 to diode 166 (the shunt field voltage is negative), and also providing a voltage to emitter 106 of unijunction transistor 104 whereby transistor 104 is conditioned for normal operation. It is seen that prior to the energization of relay K, capacitor 160 in the power circuit is essentially short circuited through saturable current transformer 154 and normally closed contacts K3 and inductor 170.

In the operation of the power circuit, there is sufficient time delay between the energization of relay K and a first gating pulse for silicon controlled rectifier 152 for capacitor 160 to receive an initial charge in excess of the aforesaid given level. Such time delay therefore prevents commutation failure at startup.

When maximum output is desired, it is necessary to be able to place the pulses on shunt field 14 almost immediately following upon each other, i.e., in "head to toe"

arrangement. However, it must be ensured that silicon controlled rectifier 152 does not receive a gating pulse at a time that it is still in a conduction cycle or while current is flowing through saturable current transformer 154 to shunt field 14. The time of such conduction cycle is also the time that the voltage on shunt field 14 is positive. To insure that silicon controlled rectifier 152 is not so gated at such time, unijunction transistor 104 is prevented from being rendered conductive while the voltage on shunt field is positive. Such prevention is accomplished with reference diodes 184 and 186. Reference diode 186 serves to clamp the voltage at emitter 106 such that unijunction transistor 104 cannot be triggered into conduction when a voltage which is the sum of the breakdown voltages across reference diodes 182 and 184 appear at base 108 of unijunction transistor 104. However, if the voltage at base 108 is reduced to the breakdown voltage of reference diode 182 only, then unijunction transistor 104 can be triggered into conductivity.

In this latter connection, it is to be noted that the junction 183 of the voltage divider comprising reference diode 182 and reference diode 184 is connected to shunt field 14 through the anode to cathode path of a diode 168 and inductor 172. When the shunt field voltage is negative, junction 183 is essentially at ground potential. Accordingly, a lower voltage appears at base 108 and the clamp provided by reference diode 186 is not effective whereby the relaxation oscillator can function. When the voltage in shunt field 14 is positive, diode 168 functions as a current blocking device and the voltage at base 108 is the sum of the breakdown voltages of reference diodes 182 and 184. Since reference diode 186 clamps emitter 106 at a low enough voltage to prevent unijunction transistor 104 from being triggered, with the arrangement as described, the so called "head to toe" shunt field voltage pulses may be obtained and at the same time commutation failure in the power circuit is prevented.

Inductor 188 shorted across an additional magnetic amplifier control winding 56 provides system stability without sacrificing regulation accuracy. Accordingly, there is provided adequate system phase margin with little or no sacrifice of transient response.

To enable paralleling of the system shown in FIGS. 1 to 4 with any number of similar systems, a load division is effected by a control winding 54 of magnetic amplifier 50 and adjustment resistors 190 and 192, winding 54 being connected between a point, suitably the midpoint on series field 12 and the equalizing buss. The mode of operation of such load division is analogous to the operation of the well known carbon pie regulator system. It is seen that if the direction of current flow through winding 54 is such as to increase the positive ampere turns therein as shown by the polarity dot thereon, the output of the magnetic amplifier is increased to effect an increase in the output voltage of the system.

Figure 6:
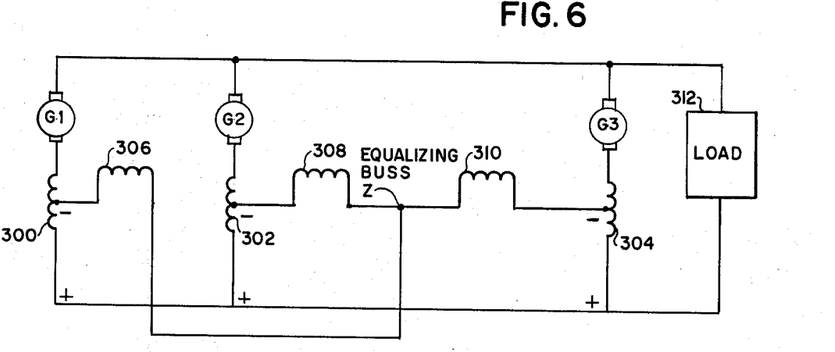
FIG. 6 is a diagram useful in explaining the paralleling of a plurality of systems.

To understand the paralleling arrangement, reference is made to FIG. 6. In this figure, there are shown three D.C. generators G1, G2, and G3 arranged in parallel. Associated with generators G1, G2, and G3 are their series fields 300, 302, and 304 respectively. Control windings of magnetic amplifiers 306, 308, and 310 similar to control winding 54 of magnetic amplifier 18 in FIGS. 2–4 are connected between points on series fields 300, 302, and 304, and the equalizing buss. The block 312 depicts the load for the parallel arrangement.

In the operation of the arrangement of FIG. 6, if it is assumed that generator G1 is providing more than its share of load current, the point at which winding 306 is connected to series field 300 becomes more negative than point Z. Current then flows through the equalizing control winding 306.

Thus, referring back to FIGS. 2–4, in the event that generator 10 is providing more than its share of load current in a parallel arrangement, the direction of current flow through equalizing winding 54 is such as to decrease the output of magnetic amplifier 18. Resistors 190 and 192 are utilized to adjust paralleling gain and also to provide proper impedance to the equalizing circuit.

While there has been shown a particular embodiment of this invention, it will, of course, be understood that it is not wished to be limited thereto since different modifications may be made both in the circuit arrangements and in the instrumentalities employed, and it is contemplated in the appended claims to cover any such modifications as fall within the true spirit and scope of the invention.

What is claimed as new and desired to be secured by Letters Patent of the United States is:

1. In combination with a direct current generator including a shunt field, a reference voltage source, means in circuit with said source and said generator for comparing the voltages therefrom to derive a difference voltage therebetween, variable frequency oscillating means, means for applying said difference voltage to said oscillating means at a level which is a function of the magnitude of said difference voltage to produce a pulse train comprising pulses having a chosen width, the periods between said pulses being a function of said magnitude, and means in circuit with said oscillating means and said shunt field which is periodically rendered conductive by the application of said pulses thereto, the current from last-named means being supplied to said shunt field.

2. In combination with a direct current generator including a shunt field, a reference voltage source, means in circuit with said source and said generator for comparing the voltages therefrom to derive a difference voltage therebetween, variable freqeuncy oscillating means, magnetic amplifier means comprising control and gate means, means for applying said difference voltage to said control means to energize said amplifier means, the durations of the output from said amplifier means being determined by the magnitude of said difference voltage, means for applying the output of said amplifier means to said oscillating means to produce a pulse train comprising pulses of chosen widths, the periods between said pulses varying inversely with said durations, and means in circuit with said oscillating means and said shunt field which is periodically rendered conductive in response to the application thereto of said pulses, the current from said last-named means being supplied to said shunt field.

3. In combination with a direct current generator including a shunt field, a reference voltage source, means in circuit with said source and said generator for comparing the voltages therefrom to derive a difference voltage therebetween, magnetic amplifier means including control means and gate means, fixed frequency oscillating means, means for applying the output of said comparing means to said control means, means for applying the output of said fixed frequency oscillating means to said gate means, an output being produced from said magnetic amplifier means in response to the application thereto of the output of said comparing means and the output of said fixed frequency oscillating means, the durations of the output of said magnetic amplifier means being a function of the magnitude of said difference voltage, variable frequency oscillating means, means for applying the output of said magnetic amplifier means to said variable frequency oscillating means to produce a pulse train comprising pulses of a chosen width, the periods between said pulses varying inversely with said durations, and means in circuit with said variable frequency oscillating means and said shunt field which is periodically rendered conductive in response to the application thereto of said pulses, the current from said last-named means being supplied to said shunt field.

4. In combination with a direct current generator including a shunt field, means for deriving a reference voltage from the output of said generator, means in circuit with said reference voltage deriving means and said generator for comparing the voltages therefrom to derive a difference voltage therebetween, magnetic amplifier means including control means and gate means, fixed frequency oscillating means, means for applying the output of said comparing means to said control means in a polarity such that when said reference voltage exceeds said generator voltage, the output of said magnetic amplifier means is increased, means for applying the output of said fixed frequency oscillating means to said gate means, the durations of the output of said magnetic amplifier means consequently varying directly with the magnitude of the difference voltage produced when said reference voltage exceeds said generator voltage, variable frequency oscillating means, means for applying the output of said magnetic amplifier means to said variable frequency oscillating means to produce a pulse train therefrom comprising pulses of a chosen width, the periods between said pulses varying inversely with said durations, and means in circuit with said variable frequency oscillating means and said shunt field which is periodically rendered conductive in response to the application thereto of said pulses, the current from said last-named means being supplied to said shunt field.

5. In combination with a direct current generator including a shunt field, means in circuit with said generator for deriving a reference voltage from the output thereof, means in circuit with said reference voltage deriving means and said generator for comparing the voltages therefrom to derive a difference voltage therebetween, magnetic amplifier means including control means and gate means, rectangular wave generating means, means for applying the output of said comparing means to said control means in such polarity that when said reference voltage exceeds said generator output voltage, the output of said magnetic amplifier means is increased, means for applying the output of said rectangular wave generating means to said gate means, the duration of the output of said magnetic amplifier means consequently varying directly with the difference voltage produced when said reference voltage exceeds said generator output voltage, variable frequency pulse generating means, means for applying the output of said magnetic amplifier means to said variable frequency pulse generating means to produce a pulse train therefrom comprising pulses of a given width, the periods between said pulses varying inversely with said magnetic amplifier means output durations, and switching means in circuit with said variable frequency pulse generating means and said shunt field which is periodically rendered conductive in response to the application thereto of said pulses, the current from said last-named means being applied to said shunt field.

6. In combination with a direct current generator including a shunt field, means in circuit with said generator for deriving a reference voltage from the output thereof, means in circuit with said reference voltage deriving means and said generator for comparing the voltages therefrom to derive a difference voltage therebetween, magnetic amplifier means including control means and gate means, rectangular wave generating means, means for applying the output of said comparing means to said control means in such polarity that when said reference voltage exceeds said generator output voltage, the output of said magnetic amplifier means is increased, means for applying the output of said rectangular wave generating means to said gate means, the duration of the output of said magnetic amplifier means consequently varying directly with the difference voltage produced when said reference voltage exceeds said generator output voltage, variable frequency pulse generating means, means for applying the output of said magnetic amplifier means to said variable frequency pulse generating means to produce a pulse train therefrom comprising pulses of a given width, the periods between said pulses varying inversely with said magnetic amplifier means output durations, switching means in circuit with said variable frequency pulse generating means and said shunt field which is periodically rendered conductive in response to the application thereto of said pulses, the current from said last-named means being applied to said shunt field, means responsive to the magnitude of the voltage from said generator for preventing the rendering conductive of said switching means in response to the application thereto of said pulses until the magnitude of said generator voltage attains a prescribed value, means in circuit with said variable frequency pulse generating means and said generator for preventing the enabling of said variable frequency pulse generating means when a voltage of the output of said magnetic amplifier means applied thereto is below a predetermined level and inhibiting means in circuit with said shunt field and said variable frequency pulse generating means for preventing the enabling of said variable frequency generating means in response to a voltage on said shunt field of a given polarity whereby a pulse is not applied to said switching means unless the conductivity in said switching means effected by the application thereto of the immediately preceding pulse is completed.

7. In the combination defined in claim 6 wherein said reference voltage is derived across a reference diode in circuit with said generator and a reference potential.

8. In the combination defined in claim 6 wherein said control means includes a first control winding to which the output of said comparing means is applied and a second control winding, said combination further including an inductance connected in shunt with said second control winding.

9. In the combination defined in claim 8 wherein said rectangular wave generating means comprises a magnetic coupled multivibrator and wherein said gate means comprises first and second windings, the opposite phased outputs of said multivibrator being applied to said first and second gate windings respectively.

10. In the combination defined in claim 6 wherein said variable frequency pulse generating means comprises a relaxation oscillator, said oscillator including a unijunction transistor having an emitter and first and second bases, and a time constant circuit in circuit with said emitter, the output of said magnetic amplifier means being applied to said emitter.

11. In the combination defined in claim 10 wherein said means for preventing the enabling of said pulse generating means comprises means in circuit with said emitter and said generator for clamping the voltage at said emitter to the voltage of said generator when said generator voltage is below said predetermined level.

12. In the combination defined in claim 6 wherein the means for preventing the rendering conductive of said switching means when said generator voltage is below said prescribed value comprises relay means which is energized in response to a voltage at least equal to said prescribed value and means responsive to the energization of said relay means and in circuit with said magnetic amplifier means and said pulse generating means for applying the output of said magnetic amplifier means to said pulse generating means.

13. In the combination defined in claim 6 wherein said pulse generating means comprises a relaxation oscillator including a unijunction transistor having an emitter, a first base and a second base, said unijunction transistor being rendered conductive in response to the application to said emitter of a voltage of said predetermined value, the voltages at said first and second bases being of respective different chosen values, and wherein said inhibiting means comprises means for effecting the application of voltages to said emitter and said first and second bases in response to a positive voltage on said shunt field such that said unijunction transistor is prevented from being rendered conductive.

14. In a parallel arrangement of a plurality of direct current generators, each of said generators comprising a series field and a shunt field, the combination with each of said generators of means in circuit with a generator for deriving a reference voltage from the output thereof, means in circuit with said reference voltage deriving means and said generator for comparing the voltages therefrom to derive a difference voltage therebetween, magnetic amplifier means including control means and gate means, rectangular wave generating means, means for applying the output of said comparing means to said control means in such polarity that when said reference voltage exceeds said generator voltage, the output of said magnetic amplifier means is increased, means for applying the output of said rectangular wave generating means to said gate means, the durations of the output of said magnetic amplifier means consequently varying directly with the difference voltage produced when said reference voltage exceeds said generator voltage, variable frequency pulse generating means, means for applying the output of said magnetic amplifier means to said variable frequency pulse generating means to produce a pulse train therefrom comprising pulses of a given width, the periods between said pulses varying inversely with said magnetic amplifier means durations, switching means in circuit with said pulse generating means and said shunt field which is periodically rendered conductive in response to the application thereto of said pulses, the current from said last-named means being applied to said shunt field, and means for applying a portion of the voltage on said series field to said control means to effect equal load sharing between said generator and the other generators in said arrangement.

15. In the combination defined in claim 14 wherein said control means includes a control winding to which said voltage from said series field is compared with the voltage on the series field of another generator to provide a difference voltage therebetween, said difference voltage being applied to said control windings of each of said respective generators.

References Cited by the Examiner

UNITED STATES PATENTS

| | | |
|---|---|---|
| 2,740,086 | 3/56 | Evans et al. |
| 2,866,944 | 12/58 | Zelina _________________ 322—73 |
| 2,886,763 | 5/59 | Zelina. |
| 2,896,149 | 7/59 | Lowry et al. |
| 2,980,844 | 4/61 | Peaslee. |
| 3,076,922 | 2/63 | Seike. |

LLOYD McCOLLUM, *Primary Examiner.*

MILTON O. HIRSHFIELD, *Examiner.*